3,794,603
ZN++-BENZOTRIAZOLE-H₂SO₄ CORROSION-INHIBITOR

Cleveland O'Neal, Jr., and Joseph A. Goetz, Toledo, Ohio, assignors to The Sherwin-Williams Company, Cleveland, Ohio
No Drawing. Filed Jan. 17, 1972, Ser. No. 218,565
Int. Cl. C23f 11/10, 11/18
U.S. Cl. 252—389 R                 7 Claims

ABSTRACT OF THE DISCLOSURE

Corrosion-inhibiting compositions of $Zn^{++}$ cations, benzotriazole and $H_2SO_4$, alone or in combination with other corrosion-inhibitors, are disclosed. Addition of diethylenetriaminepentaacetic acid allows formulation of a corrosion-inhibiting composition having a neutral pH.

BACKGROUND OF THE INVENTION

This invention relates to corrosion-inhibition and more particularly to compositions which are effective in reducing corrosion of metalic surfaces in contact with water.

Corrosion of metals in contact with a water system involves an electro-chemical attack For this attack to occur, a potential difference must exist between one part of the structure and another. The primary reaction in the region at the lower potential, i.e., the anode, is the dissolution of metal in the form of ions. The electrons liberated by this reaction migrate through the metal and are utilized in the reduction of either ions or oxygen. The overall effect is the passage of a current through the circuit formed by metal and solution, the current carriers being electrons in the metal and dissolved ions in the solution.

Corrosion-inhibitors are useful in such systems as domestic water supply systems, circulating water systems for cooling or air-conditioning, steam-generating plants, condensers, refrigerating brines, and acid pickling systems.

In preventing local attack or general corrosion, inhibitors serve a number of desirable functions. They avoid the blockage of pipes by corrosion products, keep the water clean for biological or esthetic reasons and maintain optimum conditions for heat transfer. The latter characteristic may be just as important as the reduction in corrosion products. The ability to maintain good pumping capacity in a pipe may mean an appreciable saving in cost because the design diameter can be smaller than is the case if allowance has to be made for roughness and reduction in diameter caused by build-up of corrosion products.

Effective corrosion-inhibiting treatment of such systems is made difficult by the geometry of the system, the large capacity, dissimilar metals present, and by other variable factors such as salt and oxygen content, flow velocity, temperature and volume of make-up.

A large amount of study of corrosion over the last thirty years has produced a store of knowledge relating to corrosion-inhibition. Inorganic compositions such as chromates, dichromates, nitrites, silicates, phosphates and carbonates have been used successfully as corrosion-inhibitors. Both chromates and dichromates are widely used under service conditions and are very effective when properly applied. Owing to their toxicity however, their use is restricted to industrial waters and may have to be eliminated entirely in view of ecological considerations. Sodium nitrite is an effective inhibitor for iron and a number of other metals in a wide variety of water ranging from fresh water up to brackish water and sea water. A high percentage of nitrite is needed as the sodium chloride content of the water to be treated increases. Also, bacteria can readily oxidize nitrite to nitrate which has no corrosion-inhibiting action. Polyphosphates and silicates behave in a similar way in the treatment of waters; they both tend to buffer on the alkaline side of neutrality, and both require the presence of oxygen.

Organic compounds such as sodium and potassium benzoate, monoethanolamine benzoates and salicylates, and alkylphosphonic acids are known to inhibit metal corrosion. Sodium mercapto-benzothiazole and benzotriazole have been known as effective corrosion-inhibitors for copper, copper alloys and other non-ferrous metals and alloys. In recent years increasing emphasis has been placed on the use of organic corrosion-inhibitors.

In addition to corrosion problems, cooling water systems are subject to other difficulties, depending upon impurities present in the water. For example, if the cooling water is vaporized, scale formation may be a problem; this problem can be avoided by "softening" the water, e.g., by ion exchange treatment or by precipitating the "scale formers," by adding a seqeustering agent such as a lignosulfonate, an inorganic polyphosphate, an organo phosphonate or a polysilicate of the type formed by a sodium silicate, or, as suggested in U.S. Pat. No. 3,492,-240, by adding hydrolyzed polyacrylonitrile or, as suggested by French Pat. No. 1,550,452, by adding polymethacrylic acid or an alkali salt thereof. It is frequently desirable to add a biocide to cooling water, e.g., to inhibit the growth of algae therein. Water from the available source may also contain silt, which can cause serious loss of heat exchange efficiency unless its deposition on heat exchanger surfaces is prevented. This can be accomplished by using certain lignosulfonate dispersants or, preferably polyelectrolytes, in particular, polyacrylics: see, for example "General Deposit Control Mechanisms," William H. Hales, Special Report presented at: International Water Conference, 13th Annual Meeting, William Penn Hotel, Pittsburg, Pa. Oct. 28–30, 1969.

In addition, water from the available source may contain oil contamination, and detergents used to emulsify such contamination. Various pH control agents are often added to cooling water systems to neutralize acid or alkali substances picked up by the circulating water.

The treatment of the water in cooling water systems is a continuing problem, because chemicals added to the system may be lost as a consequence of chemica' reactions that are involved in their performance of the desired function, because the chemical composition of the cooling water is changed as a consequence of its actual use, because make-up water must be added to the system from time to time, thereby diluting the entire system, because cooling water is periodically or continually removed from the system to prevent salt build-up, or for a combination of these and other reasons. Accordingly, it is necessary to monitor any given cooling water system periodically, and to make appropriate additions of treating chemicals. The frequency of the monitoring and addition varies drastically from system to system, and may be measured in months, weeks, days or hours: in extreme cases, continuous monitoring may be required.

It is highly desirable to add various treating chemicals to cooling water as aqueous solutions, because this enables volumetric metering as distinguished from gravimetric metering. It is much easier to add the required number of milliliters of a solution of known concentration than it is to add the corresponding number of milligrams of a solid treating chemical.

DEFINITIONS

In this specification, and in the attached claims:
The terms "percent" and "parts" refer to percent and parts by weight, unless otherwise indicated.
The term "BT" means benzotriazole.

(H)BT refers to the hydrogen form of benzotriazole, which is a weak acid, as distinguished from, for example, the sodium salt.

"DTPA" means diethylenetriaminepentaacetic acid.

SUMMARY OF THE INVENTION

The instant invention is based upon the discovery that metal surfaces in contact with water can be protected against corrosion by adding to the aqueous system a corrosion-inhibiting composition containing from about ¼ percent to 10 percent $Zn^{++}$ cations, from about ¼ percent to about 3 percent benzotriazole, and from about 0.4 percent to about 1 percent $H_2SO_4$. Additionally, the composition when added to diethylenetriaminepentaacetic acid, for example, can be neutralized.

OBJECTS

It is therefore an object of this invention to provide a method and composition for inhibiting metal corrosion in aqueous systems.

It is a further object of this invention to provide a method for improving the corrosion-inhibiting effect of commercially available corrosion-inhibitors.

It is a still further object of this invention to provide a non-precipitating corrosion-inhibiting composition containing $Zn^{++}$ cations and BT.

EXAMPLE 1

A $Zn^{++}$-BT-$H_2SO_4$ corrosion-inhibiting solution was prepared as described below.

4 ml. portion of $H_2SO_4$ (16 percent) was added to 35 ml. $ZnSO_4$ (20 percent). After mixing, a 35 ml. portion of sodium BT was added to the $Zn^{++}$-$H_2SO_4$ solution. No precipitate formed. The corrosion-inhibiting solution contained 4.25 percent by weight $Zn^{++}$ cations, 1.81 percent by weight (H)BT, and 0.86 percent by weight $H_2SO_4$, balance water.

The effectiveness of the $Zn^{++}$-BT-$H_2SO_4$ solution was tested by means of an $H_2S$ corrosion chamber. Two copper specimens were thoroughly cleaned; one specimen was dipped in the corrosion-inhibiting solution, and the other specimen was left untreated. Both specimens were inserted in the $H_2S$ chamber for a period of 15 minutes. Examination of the two copper specimens showed that the $$Zn^{++}\text{-BT-}H_2SO_4$$

solution protected the specimen against corrosion.

Comparative procedure A

For purposes of comparison, but not in accordance with the invention, a solution of BT was added to a solution containing $Zn^{++}$ cations.

A 0.1 ml. portion of the sodium salt of BT (containing less than 0.002 percent BT), was added to 25 ml. of a $ZnSO_4$ solution containing 0.202 percent $Zn^{++}$ cations. A precipitate formed immediately. Analysis of the precipitate indicated that it was a Zn-BT complex of approximately 75 percent BT and 21 percent zinc. Evaluation of the above solution containing the Zn-BT complex confirmed that the $Zn^{++}$ cations and BT are "tied-up," and thus the formulation does not function as a corrosion-inhibitor. To avoid exceeding the $K_{sp}$ of the $Zn^{++}$ and BT, and formation of a Zn-BT complex, the concentration of the $Zn^{++}$ and BT would be so low as to be ineffective in inhibiting corrosion.

$Zn^{++}$ cations effectively inhibit corrosion of iron, but not copper. Conversely, BT effectively inhibits corrosion of copper, but may be comparatively ineffective at inhibiting corrosion of iron. Thus although an effective concentration of BT or $Zn^{++}$ cations alone can be maintained by using an excess of either BT or $Zn^{++}$ cations, it is desirable to maintain an effective concentration of both $Zn^{++}$ cations and BT. Specifically, it is desirable to maintain an effective component ratio, i.e., a $Zn^{++}$/BT ratio, of from 2:1 to 5:1. This is accomplished easily by using the composition of the instant invention.

Since BT is only slightly soluble in water, only a small amount of BT is capable of being dissolved in an aqueous system. This limited water solubility can be enhanced by the use of from 5 percent to 20 percent of a water miscible organic solvent such as isopropanol or ethylene glycol.

Previously it has been common practice to use a $Zn^{++}$-HCl formulation. $Zn^{++}$ and BT are not compatible in a chloride system, forming the complex as discussed above. Because of this, so far as is known, it has not heretofore been possible to produce a single formulation containing both $Zn^{++}$ cations and BT at a concentration sufficient to effectively inhibit corrosion.

EXAMPLE II

Several $Zn^{++}$-BT-$H_2SO_4$ corrosion-inhibiting solutions, having varying $Zn^{++}$/BT ratios, were prepared using the method described in Example I. Table I illustrates the proportions used:

TABLE I

| | Percent | | | | |
|---|---|---|---|---|---|
| | $Zn^{++}$/BT | BT | $H_2SO_4$ | $Zn^{++}$ | Total Inhibitor |
| Solution: | | | | | |
| 1 (Example 1) | 2.35 | 1.81 | 0.71 | 4.25 | 6.06 |
| 2 | 4.85 | 1.15 | 0.56 | 5.57 | 6.72 |
| 3 | 4.96 | 1.14 | 0.54 | 5.66 | 6.80 |
| 4 | 5.34 | 1.23 | 0.63 | 6.6 | 7.75 |

$H_2S$ corrosion chamber test results showed that the above solutions, having a $Zn^{++}$/BT weight ratio from 2.35:1 to 5.34:1, were effective in preventing corrosion of cleaned copper samples.

While the $Zn^{++}$-BT-$H_2SO_4$ compositions can be used alone, other components can be added to provide a multifunctional water-tratment formulation. Such a formulation can be "tailor-made" to deal with specific problems of a given water supply in addition to corrosion-control. For example, removal of suspended solids or other colloidal matter, prevention of silica deposition, control of biological growths and prevention of attack on cooling-tower wood. To accomplish these and other objectives, the composition of the invention can be used in conjunction with various chelants, lignosulfonates, polyphosphonates, polymers and other compounds well-known in the art.

In many cooling water systems it is common practice to control the pH of the water in the range of about 5 to 8. Experimental work was conducted to obtain a $$Zn^{++}\text{-BT-}H_2SO_4$$

solution containing a high concentration of $Z^{++}$ and BT in a neutral pH range.

EXAMPLE III

A $Zn^{++}$-BT-$H_2SO_4$ corrosion-inhibiting solution, having a $Zn^{++}$/BT weight ratio of 2.72:1, was prepared as described in Example I. The $Zn^{++}$-BT-$H_2SO_4$ solution was added to a 5 percent by weight solution of a chelating agent, the pentasodium salt of DTPA.

Limiting amounts of the inhibiting solution were determined by formation of a precipitate; the limiting amount was determined to be a 1:1 mole ratio or $Z^{++}$/DTPA. The pH of the solution exceeded 11.0; addition of a few mls. of 20 percent by weight acetic acid adjusted the pH to about 7.

The neutral formulation described was tested for BT availability by using the previously described $H_2S$ corrosion chamber test. One series of cleaned copper panels was dipped into the above neutral solution, while another series of cleaned copper panels was dipped into a solution containing an equivalent weight percent BT only, and a third series of non-dipped cleaned copper panels was placed in the corrosion chamber as a control. After 20 minutes exposure time in the $H_2S$ chamber the dipped panels appeared to have an equal resistance to corrosion. The control panel was corroded.

Because chelant ligands have a structure that permits the attachment of two or more donor sites to a metal ion simultaneously, thereby removing the ion from solution by closing one or more rings, atest was conducted to determine the availability of the $Zn^{++}$ in the $$Zn^{++}\text{-BT-}H_2SO_4\text{-DTPA}$$

solution.

Three jars containing corrosion water prepared as described in ASTM test method D1384 were used; cast iron and mild steel coupons were immersed in the water in the three jars for 24 hours.

TABLE II

| | Results, cast iron and steel |
|---|---|
| Corrosion water (control) | Immediate Corrosion. |
| Corrosion water plus $Zn^{++}$-BT-$H_2SO_4$-DTPA neutral formulation (.001% $Zn^{++}$, .0008% BT) | No corrosion. |
| Corrosion water plus .0008% Bt | Immediate Corrosion. |

The above test shows that addition of the DTPA to the $Zn^{++}$-BT-$H_2SO_4$ corrosion-inhibiting solution does not remove the $Zn^{++}$ cations from availability as a corrosion-inhibitor.

EXAMPLE IV

A $Zn^{++}$-BT-$H_2SO_4$ corrosion-inhibiting solution prepared as described in Example I, was mixed with a phosphonate and tested for corrosion-inhibiting properties. The solution contained 2.52 percent by weight $Zn^{++}$ cations, 1.37 percent by weight (H)BT, 1.02 percent by weight $H_2SO_4$, and 25.35 percent by weight phosphonate. The phosphonate was supplied by adding a 3.54 g. portion of a phosphoric acid to the $Zn^{++}$-BT-$H_2SO_4$ solution. The specific phosphonic acid used is sold by Aldrich Chemical Company, as a 50 percent aqueous solution of nitrilotris (methylene) triphosphonic acid.

The above-prepared solution having a $Zn^{++}$/BT ratio of 1.83, was tested for BT availability by using the previously described $H_2S$ corrosion chamber test. The pH of the solution was slightly less than 1. Four series of cleaned copper panels were tested. Sufficient quantities of the above solution were added to three containers of ordinary tap water to provide .0001 percent by weight, .0002 percent by weight, and .0003 percent by weight of BT respectively. A treated control panel, not dipped into a corrosion-inhibition solution, was used as a control. After 15 minutes exposure time in the $H_2S$ chamber the dipped panels showed little or no corrosion. The control panel showed a considerable amount of corrosion.

The above solution was tested to determine the availability of $Zn^{++}$ cations by the testing procedure outlined in Example II, except that the exposure time was 72 hours.

TABLE III

| | Weight loss in mg. | |
|---|---|---|
| | Cast iron | Steel |
| Corrosion water (control) | 9.53 | 7.75 |
| Corrosion water plus $Zn^{++}$-BT-$H_2SO_4$-phosphonate formulation (.000030% $Zn^{++}$, .000016% BT) | 8.52 | 6.94 |
| Corrosion water plus $Zn^{++}$-BT-$H_2SO_4$-phosphonate formulation (.000060% $Zn^{++}$, .000032% BT) | 4.83 | 3.72 |

The above test results show that the formulation containing amounts of available $Zn^{++}$ cations as low as .000029 percent by weight is effective in reducing the amount of corrosion of the ferrous test coupons. Doubling the amount of available $Zn^{++}$ cations to .000058 percent by weight shows a significant increase in corrosion resistance. The weight loss is decreased by over 40 percent.

EXAMPLE V

A $Zn^{++}$-BT-$H_2SO_4$ corrosion-inhibiting solution prepared as described in Example I, was mixed with a lignosulfonate and phosphonate. The solution contained 1.95 percent by weight $Zn^{++}$ cations, 0.38 percent by weight (H)BT, 12.03 percent by weight of sodium lignosulfonate and 0.64 percent by weight of a phosphonate. The phosphonate used is sold under the designation Dequest 2006, as a 40 percent active aqueous phosphonate solution. The pH of the corrosion-inhibiting solution was adjusted to about 6 by addition of 0.53 percent by weight $NaSiO_3$. The solution had a $Zn^{++}$/BT ratio of 5.13.

$H_2S$ corrosion chamber tests were conducted to determine the availability of BT. The procedure described in Example IV was used, except that the test solutions contained .000114 percent by weight, .000228 percent by weight and .000285 percent by weight of BT respectively. After 15 minutes exposure time in the $H_2S$ chamber the dipped panels showed little or no corrosion. The control panel showed a considerable amount of corrosion.

The above solution was tested to determine the availability of $Zn^{++}$ cations by the testing procedure outlined in Example II, except that the exposure time was 72 hours.

TABLE IV

| | Weight loss in mg. | |
|---|---|---|
| | Cast iron | Steel |
| Corrosion water | 11.56 | 8.92 |
| Corrosion water plus $Zn^{++}$-BT-$H_2SO_4$-lignosulfonate phosphonate formulation (.000029% $Zn^{++}$, .000005% BT) | 7.84 | 7.43 |
| Corrosion water plus lignosulfonate phosphonate formulation (.000058% $Zn^{++}$, .000012% BT) | 4.41 | 3.64 |

The above test results show that the formulation containing amounts of available $Zn^{++}$ cations as low as .000029 percent by weight is effective in reducing the amount of corrosion of the ferrous test coupons. Doubling the amount of available $Zn^{++}$ cations to .000058 percent by weight shows a significant increase in corrosion resistance. The weight loss is decreased by over 40 percent.

It will be appreciated from the foregoing examples that a corrosion-inhibiting composition is provided according to the instant invention. The composition consists essentially of $Zn^{++}$ cations, benzotriazole and $H_2SO_4$ in the proportions indicated above. The composition can be used alone, for example to prevent corrosion of both copper and iron, or it can be used in combinations with other conventional constituents of corrosion-inhibiting compositions, provided that the other constituents do not cause the formation of the Zn-BT complex discussed above. Examples of other conventional constituents of corrosion-inhibiting compositions that can be added to a composition according to the invention include chelants, DTPA being a particularly useful chelant because it enables the adjustment of the composition to a neutral or near neutral pH, as discussed above, lignosulfonates, inorganic polyphosphates, organic phosphonates, polymers, and micro-organism inhibitors to control the growth of algae, bacteria and fungi.

What I claim is:

1. A composition for inhibiting the corrosion of metal in a water system consisting essentially of water, $Zn^{++}$ cations, benzotriazole and $H_2SO_4$, said composition containing from about ¼ percent to about 10 percent $Zn^{++}$ cations, from at least about ¼ percent benzotriazole, and from about 0.4 percent to about 1 percent of $H_2SO_4$.

2. The composition of claim 1 additionally containing diethylenetriaminepentaacetic acid in an amount sufficient to raise the pH of said composition to at least about 8.

3. The composition of claim 2 additionally containing acid in an amount sufficient to adjust the pH of said composition to one in the range of 5-8.

4. A process for producing an aqueous corrosion-inhibiting composition which comprises the steps of producing a first solution of $Zn^{++}$ cations and $H_2SO_4$ and adding a second solution of sodium benzotriazole to said first solution, controlling the concentration and relative proportions of the two solutions such that said composition consists essentially of water, from about ¼ percent to about 10 percent $Zn^{++}$ cations, from at least about ¼ percent benzotriazole, and from about 0.4 percent to about 1 percent $H_2SO_4$.

5. A process as claimed in claim 4 wherein the $Zn^{++}$ cations are supplied by $ZnSO_4$.

6. A process for producing for an aqueous corrosion-inhibiting composition which comprises the steps of producing a first solution of $Zn^{++}$ cations and $H_2SO_4$ and adding a second solution of sodium benzotriazole to said first solution, controlling the concentration of the two solutions such that the said composition consists essentially of from about ¼ percent to about 10 percent $Zn^{++}$ cations, from at least about ¼ percent benzotriazole, and from about 0.4 percent to about 1 percent $H_2SO_4$, and forming a $Zn^{++}$-benzotriazole-$H_2SO_4$-diethylenetriaminepentaacetic acid solution by mixing said composition with an aqueous solution of diethylenetriaminepentaacetic acid such that the $Zn^{++}$/diethylenetriaminepentaacetic acid mole ratio of said $Zn^{++}$-benzotriazole-$H_2SO_4$-diethylenetriaminepentaacetic acid solution does not exceed 1:1.

7. A process as claimed in claim 6 which additionally includes the step of neutralizing said $Zn^{++}$-benzotriazole-$H_2SO_4$-diethylenetriaminepentaacetic acid solution to a pH in the range of 5–8.

References Cited
UNITED STATES PATENTS

| | | | |
|---|---|---|---|
| 2,742,369 | 4/1956 | Hatch | 252—389 A |
| 2,941,953 | 6/1960 | Hatch | 252—390 |
| 3,295,917 | 1/1967 | Cotton | 252—389 R |
| 3,483,133 | 12/1969 | Hatch et al. | 252—389 A |
| 3,510,432 | 5/1970 | Squire | 252—181 |
| 3,532,639 | 10/1970 | Hatch | 252—389 A |
| 3,598,756 | 8/1971 | Hert | 252—389 R |
| 3,653,931 | 4/1972 | Borchert | 252—390 |

CARL D. QUARFORTH, Primary Examiner

I. GLUCK, Assistant Examiner

U.S. Cl. X.R.

21—2.5 R, 2.7 R; 252—147, 148, 389 R